Oct. 28, 1969 R. E. LINDEMANN 3,475,705
ADJUSTABLE ACOUSTICAL DELAY LINES ALSO CAPABLE
OF BEING TEMPERATURE INSENSITIVE
Filed June 27, 1966 2 Sheets-Sheet 1

DETAIL A
(FIG. 2)

INVENTOR.
ROBERT E. LINDEMANN
BY
Alfred W. Barber
ATTORNEY

Oct. 28, 1969   R. E. LINDEMANN   3,475,705
ADJUSTABLE ACOUSTICAL DELAY LINES ALSO CAPABLE
OF BEING TEMPERATURE INSENSITIVE
Filed June 27, 1966   2 Sheets-Sheet 2

INVENTOR.
ROBERT E. LINDEMANN
BY
*Alfred W. Barber*
ATTORNEY

United States Patent Office 3,475,705
Patented Oct. 28, 1969

3,475,705
ADJUSTABLE ACOUSTICAL DELAY LINES ALSO CAPABLE OF BEING TEMPERATURE INSENSITIVE
Robert E. Lindemann, Farmingdale, N.Y., assignor to Digital Devices, Inc., Syosset, N.Y., a corporation of New York
Filed June 27, 1966, Ser. No. 560,631
Int. Cl. H03h 7/30
U.S. Cl. 333—30                         8 Claims

ABSTRACT OF THE DISCLOSURE

An acoustic delay line of the magnetostrictive type includes a fixed transducer and a movable transducer. A calibrated dial is geared to a helical screw for moving the movable transduced at a predetermined manner. The helical screw has an infinitely variable pitch so that extremely accurate calibration of the dial can be carried out. Additional means are provided to overcome problems due to expansion and contraction of the structure with temperature changes.

---

The present invention concerns acoustic delay lines and, for example, delay lines of the magnetostrictive type and the like.

Without limiting the invention to such, the following description will be made with particular reference to magnetostrictive delay lines although other types of acoustic delay lines may be employed.

In the computer field delay lines have applications as, for example, where digital information arriving at random time must be assembled into a continuous flow. The information in the form of digital pulses is circulated in a delay line and as additional information arrives, it is sequenced into its proper position with respect to the circulating information. While this type of delay line is generally of fixed dimensions and hence has a fixed delay time, there are also applications requiring variable amounts of delay as provided by an adjustable length delay line. The magnetostrictive type of delay line i.e. one which utilizest a longitudinal or torsional wave in a wire composed of magnetostrictive material such as iron or nickel or their alloys, is often used in such cases. An input signal is applied to the line at a certain point and an output signal is derived at a point a predetermined distance away along the line. The input and ouput transducers consist of coils surrounding the magnetostrictive line which is in the form of a wire. Adjustment of the delay can be achieved by varying the distance between the input and output transducers.

In order to provide a readily adjustable delay one of the transducers may be fixed in place while the other transducer is made movable. A convenient method of moving one of the transducers is to provide a fixed pitch helix which is rotated and a contact attached to the movable transducer riding in the groove and being progressed by the helix. It has been found that this arrangement is not very precise, however, due to the fact that the delay line material varies somewhat and a unit of length on various delay line wires does not produce exactly the same delay.

In accordance with the present invention, an adjustable delay line using a helix driven transducer is provided. The helix is rotated by means of a shaft coupled to the helix by means of two spur gears. Such a device can be calibrated so that for each rotation of the shaft, the delay is varied by a certain amount. The shaft can then carry a calibrated dial reading in microseconds or fractions of a microsecond of delay. The present invention provides a simple and effective way of varying the pitch of the driving helix with infinite resolution so that it can be made to program the transducer exactly in accordance with a dial calibration in spit of variations in the delay line propagation characteristics. In order to carry out objects of the present invention, the driving helix is made in the form of a coiled spring and by varying the longitudinal compression of the spring, its length and pitch are made variable. This form of drive is thus adjustable i.e. the linear travel of the driven transducer versus the angular rotation of the dial and shaft can be varied. This permits exact calibration of the dial in terms of delay time in spite of variations in the propagation characteristics of the delay line material.

Accordingly it is one object of the present invention to provide methods of and means for adjusting the calibration of an adjustable acoustic delay line.

Another object is to provide for continuous calibrating adjustment of such a delay line.

Still another object is to provide a simple and effective calibrating arrangement and one which is both rugged and inexpensive.

Another object is to provide an adjustable acoustic delay line which is insensitive to temperature changes.

A further object is to provide an adjustable acoustic delay line which can be readily calibrated and which is also extremely compact.

A still further object is to provide additional means for tensioning the delay line wire so that once it is calibrated it will accurately maintain such calibration.

These and other objects will be apparent from the detailed description of the invention given below in connection with the various figures of the drawing.

Figure 1:
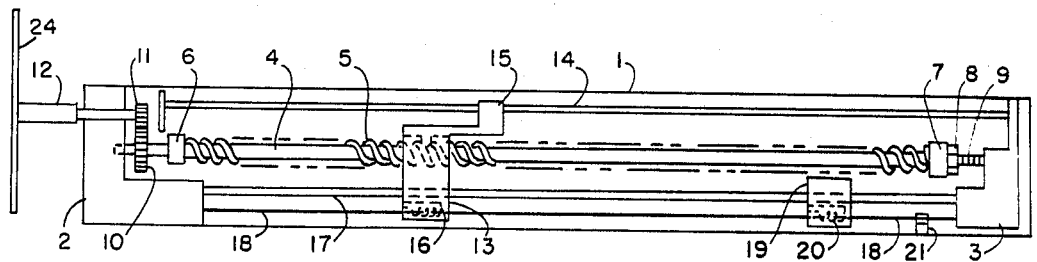
FIGURE 1 is an assembly view of an adjustable delay line in accordance with the present invention.
Figure 3:
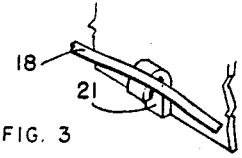
FIGURE 3 is a detail of another portion of the present invention.

FIGURE 1 shows the adjustable delay line with calibrating features in accordance with the present invention. The mechanism to be described is mounted on a suitable frame 1 having end blocks 2 and 3 drilled in accordance with the parts to be assembled thereon. A main rod 4 extending between end blocks 2 and 3 supports helix 5. The helix 5 comprises an elastic spring composed of steel, for example, under compression. Helical spring 5 is disposed around rod 4 and is defined by stop 6 at one end and by the adjustable stop 7 at the other end. One end of rod 4 is threaded as indicated at 9 and stop 7 is positioned by nut 8 riding on thread 9. The magnetomotive delay line comprises magnetomotive wire 18 extending between end blocks 2 and 3. A fixed position transducer is provided in a housing 19 including a transducer coil 20. The positionable transducer 16 is carried in a housing 13 and is guided by rods 17 and 14 extending between end blocks 2 and 3. The extension 15 of the transducer housing 13 traveling along rod 14 aids in the accuracy and smoothness of the travel of the transducer 16 along the delay line wire 18. Tension on the delay line wire 18 is maintained by elastomeric spring 21 (see FIG. 3). Transducer 16 is moved toward and away from transducer 20 by rotating helix 5. This is accomplished by means of spur gears 10 and 11 turned by shaft 12 on which is mounted the calibrated dial 24.

In order to vary the calibration of dial 24 it is necessary to vary the relationship between the rotation of this dial 24 and the motion of transducer 16 along the delay line wire 18. This variation of relationship which, also provides the calibrating method and means is accomplished by varying the pitch of helix 5 which is provided by turning nut 8 on screw thread 9. Rod 4 over which helix 5 is wound is threaded at one end 9. Helix 5 is a steel spring under compression mounted between permanently fixed stop 6 and adjustable stop 7 which has a center clearance hole permitting it to move on rod 4 as nut 8 is adjusted on thread 9. When spring 5 is compressed, its pitch is reduced so that the movement of transducer 16 along wire 18 is reduced for a given angular rotation of dial 24. In a similar manner turning nut 8 so that spring 5 is allowed to lengthen, increases the pitch of the helix and a given angular rotation of dial 24 produces a greater travel of the movable transducer. Stop 7 is keyed to shaft 4 in such a manner as to prevent radial motion and still allow axial motion between stop 7 and shaft 4 when nut 8 is turned. Since varying the distance between the transducers varies the time taken for a longitudinal wave to travel between the two, adjustment of this distance adjusts the delay time. The delay time cannot be determined on a purely geometric basis due to variations in propagation characteristics of the delay line linear element. The adjustable feature, however, permits extremely accurate calibration of dial 24 since it provides means for compensating the delay line propagation characteristics.

Figure 2:
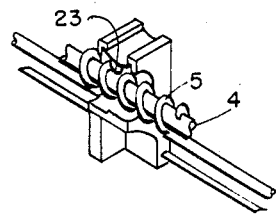
FIGURE 2 is a detail of one portion of the present invention.

The detail shown in FIG. 2 illustrates how the coupling between the adjustable transducer and the helix may be accomplished. Transducer housing 13 carries a tongue rider 23 spring biassed by spring 22 so that it makes firm contact in the groove between adjacent turns of helix spring 5.

Figure 4:
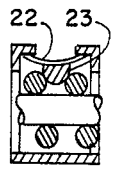
FIGURE 4 is a detail of still another portion of the invention.
Figure 4:
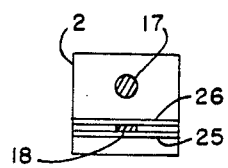

FIG. 4 shows an end view of end block 2 (the other end block 3 is similar) with linear element 18 gripped between damping leaf 25 and damping leaf 26. These damping leaves are made of a suitable plastic material or rubber which serves to damp acoustic vibrations in linear element 18 so that these vibrations which travel from one transducer to the other are damped at the ends of the linear element and are not reflected to cause disturbances in the primary transmissions between the transducers.

Figure 5:
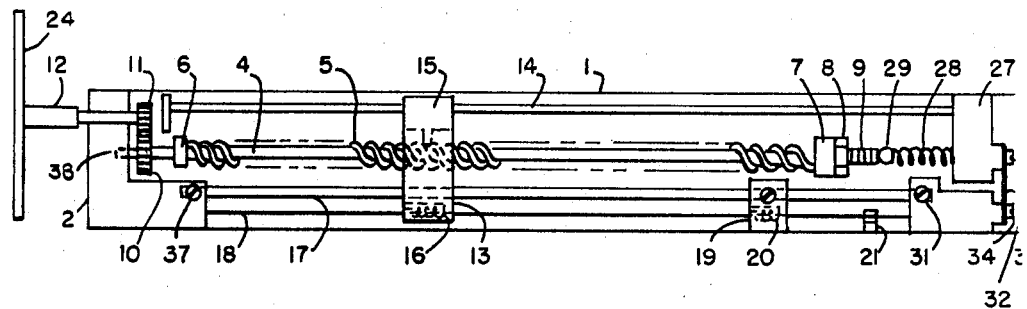
FIGURE 5 is an assembly view of a modified form of the invention.

FIG. 5 shows a modification of the present invention whereby precision is increased due to making the device insensitive to temperature changes. This is accomplished basically by rigidly mounting one end only of the helix and of the rod supporting the stationary transducer to the frame of the device allowing the other end to be free. In this way any expansion or contraction of the frame with temperature does not change the linear dimensions of the functioning parts of the device. In addition the helix center rod and the rod supporting the stationary transducer are made of low temperature coefficient material such as "Invar."

FIG. 5 shows one way in which this single ended suspension can be carried out. The end block 2 mounts rods 4 and 17 in fixed longitudinal position. Rod 4 is pressed against an end stop as, for example, hole 38 in end block 2 by spring 28 and thrust ball 29 pressing against end block 27. Rod 17 is secured in a fixed position at one end by set-screw 37 in block 2 and its other end is free to move being held by set-screw 31 in end-block 30 which in turn is flexibly mounted to block 27 by a flexible member 32 secured by screws 33 and 34 to blocks 27 and 30 respectively. Thus, while block 27 may move due to expansion and contraction of the frame or platform of the device (not shown) such movement will not change the length or longitudinal positions of rods 4 and 17 with respect to each other as the positions of both are determined solely by end-block 2.

Figure 6:
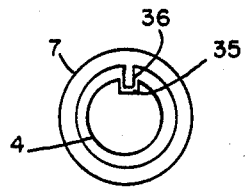
FIGURE 6 is an additional detail of a portion of the invention.

FIG. 6 shows a detail of stop nut 7 (FIG. 1) which has a tongue 36 riding in a longitudinal slot 35 in rod 4 so that it will not turn as adjusting nut 8 is turned.

While only two forms of the present invention have been shown and described, many modifications may be apparent to those skilled in the art within the spirit and scope of the invention as set forth, in particular, in the appended claims.

What is claimed is:

1. In an acoustic delay line device, the combination of, a linear element of acoustic propagation, a first transducer coupled to said element, a movable second transducer coupled to said element, and means for moving said second transducer in a direction substantially parallel to said linear element for adjusting the delay time between said transducers said means for moving said second transducer including a rotatable helix of adjustable pitch coupled to said second transducer and means for adjusting the pitch of said helix.

2. An adjustable delay line device as set forth in claim 1 and including an elastomeric spring bearing against said linear element so as to maintain predetermined tension in said element.

3. An adjustable delay line device as set forth in claim 1 wherein said means for moving said second transducer includes a calibrated dial geared to turn said helix in a predetermined ratio.

4. An adjustable delay line device as set forth in claim 1 wherein said helix is a helical spring, and further including a spring biased tongue riding in the grooves of said spring and coupled to said second transducer.

5. An adjustable delay line as set forth in claim 1 wherein said helix comprises a rod threaded at one end and a helical spring surrounding said rod, and further wherein said means for adjusting the pitch of said helix is a nut mounted on said thread for compressing said spring to adjust its pitch.

6. An adjustable delay line as set forth in claim 5 further including means for rotating said helix to move said second transducer.

7. An adjustable delay line device as set forth in claim 1 including a frame having first and second end blocks, a rod of a material having a low temperature coefficient, one end of said rod affixed to and supported by said first end block, and movable means mounting the opposite end of said rod to said second end block so as to allow movement of second end block relative to said rod, said first transducer being mounted on said rod.

8. An adjustable delay line device as set forth in claim 7 including a second rod having one end rotatably mounted in said first end block, and movable means attached to said second end block rotatably supporting the opposite end of said second rod so as to allow movement of said second end block axially relative to said second rod, said helix carried by said second rod.

References Cited

UNITED STATES PATENTS

| 2,407,294 | 9/1946 | Shockley et al. | 333—30 |
| 2,946,968 | 7/1960 | Faulkner. | |
| 3,008,087 | 11/1961 | Darwin. | |
| 3,290,649 | 12/1966 | Whitehouse. | |
| 3,405,373 | 10/1968 | Wendolkowski | 333—29 |

HERMAN KARL SAALBACH, Primary Examiner

PAUL L. GENSLER, Assistant Examiner

U.S. Cl. X.R.

74—89.15, 568